(12) United States Patent
Wijenberg et al.

(10) Patent No.: US 7,541,936 B2
(45) Date of Patent: Jun. 2, 2009

(54) USE OF WING-FANNING SOUNDS TO AFFECT COCKROACH MOVEMENT

(76) Inventors: Rosanna M. Wijenberg, 26692 112th Avenue, Maple Ridge, British Columbia (CA) V2W 1P7; Stephen J. Takacs, Apt#2008, 1001 Richards Street, Vancouver, British Columbia (CA) V6B 1J6; Gerhard Gries, 484 Cariboo Crescent, Coquitlam, British Columbia (CA) V3C 4X7

( * ) Notice: Subject to any disclaimer, the term of this patent is extended or adjusted under 35 U.S.C. 154(b) by 310 days.

(21) Appl. No.: 11/609,061

(22) Filed: Dec. 11, 2006

(65) Prior Publication Data

US 2007/0132598 A1 Jun. 14, 2007

Related U.S. Application Data

(60) Provisional application No. 60/750,086, filed on Dec. 13, 2005.

(51) Int. Cl.
*G08B 23/00* (2006.01)

(52) U.S. Cl. ............... 340/573.2; 43/113; 43/132.1; 340/384.2; 367/139

(58) Field of Classification Search ... 340/384.2–384.3, 340/573.2; 425/405; 119/718, 719; 43/74, 43/111, 107, 121, 133, 132.1, 124; 381/124; 367/139

See application file for complete search history.

(56) References Cited

U.S. PATENT DOCUMENTS

| | | | |
|---|---|---|---|
| 5,030,660 A | 7/1991 | Norris et al. | |
| 5,057,316 A | 10/1991 | Gunner et al. | |
| 5,066,482 A | 11/1991 | Kohn et al. | |
| 5,302,387 A | 4/1994 | Payne et al. | |
| 5,417,009 A * | 5/1995 | Butler et al. | 43/113 |
| 5,424,551 A | 6/1995 | Callahan | |
| 5,560,146 A | 10/1996 | Garro | |
| 5,572,825 A | 11/1996 | Gehret | |
| 6,301,194 B1 * | 10/2001 | Cauchy | 367/139 |
| 6,570,494 B1 * | 5/2003 | Leftridge, Sr. | 340/384.2 |
| 6,574,913 B2 | 6/2003 | Takács et al. | |
| 6,757,574 B2 | 6/2004 | Gardner et al. | |
| 6,882,594 B1 | 4/2005 | Pujolas | |
| 7,109,849 B2 * | 9/2006 | Caine | 340/384.2 |
| 7,362,658 B2 * | 4/2008 | Hsu | 367/139 |
| 2004/0216353 A1 | 11/2004 | Caine | |
| 2005/0022444 A1 | 2/2005 | Maddigan | |

FOREIGN PATENT DOCUMENTS

JP 10136865 5/1998

OTHER PUBLICATIONS

International Search Report and Written Opinion dated Apr. 11, 2007, Appl No. PCT/US2006/046922.

(Continued)

*Primary Examiner*—Brent Swarthout

(57) ABSTRACT

Disclosed are methods for affecting movement of a cockroach by attracting a cockroach to a specified location or repelling a cockroach from a specified location. One generates a cockroach wing-fanning sound adjacent the location and exposes the cockroach to the sound. Acoustic generators emitting wing-fanning sound are preferably incorporated into insect traps, insect bait stations and insect repelling stations.

15 Claims, 8 Drawing Sheets

OTHER PUBLICATIONS

H. Spangler et al., Ultrasonic Mate Calling in the Lesser Wax Moth, 9 Physiological Entomology 87-95 (1984).

H. Spangler, Ultrasonic Communication in Corcyra cephalonica (Stainton) (Lepidoptera: Pyralidae), 23 J. Stored Prod. Res. 203-211 (1987).

P. Trematerra et al., Ultrasound production in the courtship Behaviour Of Esphastia cautella (Walk.), E. kuehniella Z. and Plodia Interpunctella (Hb.) (Lepidoptera: Pyralidae), 31 J. Stored Prod. Res. 43-48 (1995).

S. Takacs et al., Where To Find A Mate? Resource-based Sexual Communication Of Webbing Clothes Moth, 89 Naturwissenschaften 57-59 (2002).

S. Takacs et al., Communication Encology of Webbing Clothes Moth: Attractiveness And Characterization Of Male-Produced Sonic Aggregation Signals, 127 J. Appl. Ent. 127-133 (2003).

C. Mistal et al., Evidence of Sonic Communication in the German Cockroach (Dictyoptera: Blattellida), 132 Candian Entomologist 867-876 (2000).

D. Clark et al., Social Communication In The Madagascar Hissing Cockroach: Features Of Male Courtship Hisses And A Comparison Of Courtship And Agnoistic Hisses, 132 Behavior 401-417 (1995).

* cited by examiner

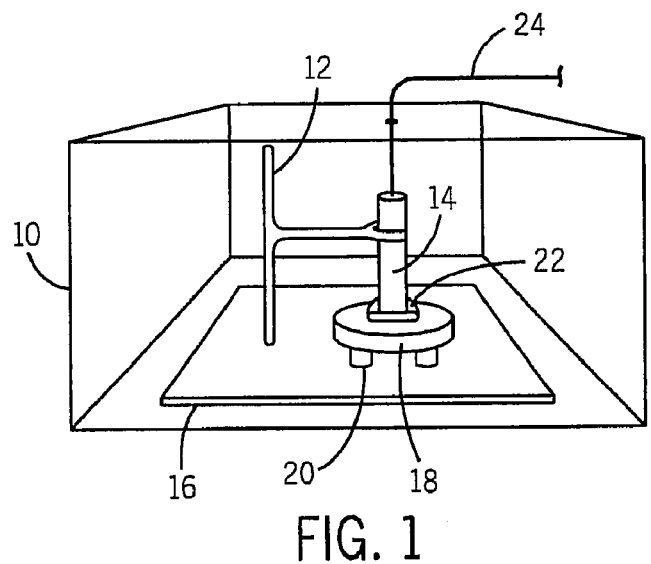
FIG. 1
FIG. 3
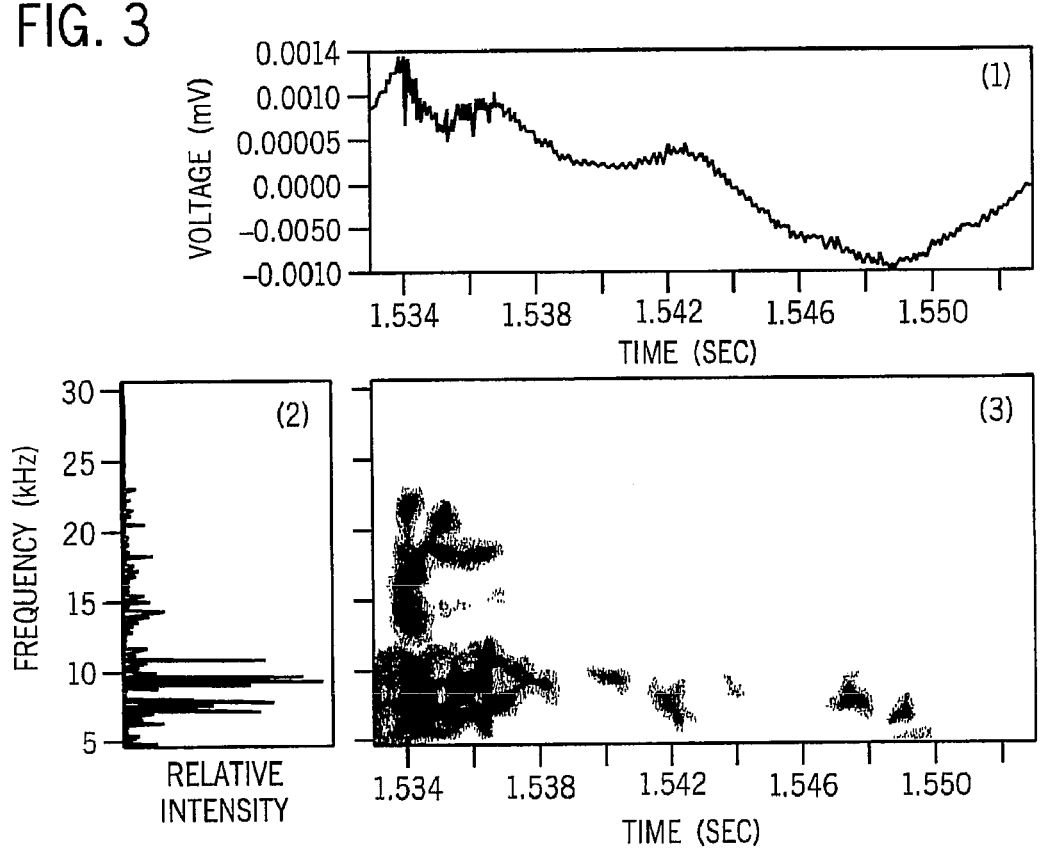

USE OF WING-FANNING SOUNDS TO AFFECT COCKROACH MOVEMENT

CROSS-REFERENCE TO RELATED APPLICATIONS

This application claims priority based on U.S. provisional application 60/750,086 which was filed on Dec. 13, 2005.

STATEMENT REGARDING FEDERALLY SPONSORED RESEARCH/DEVELOPMENT

Not applicable

BACKGROUND OF THE INVENTION

The present invention relates to the use of wing-fanning sounds of the type generated by adult cockroaches to attract or repel cockroaches. More particularly, it relates to the use of such wing-fanning sounds to facilitate trapping, killing, and/or avoidance of such cockroaches.

Traditionally there have been attempts to control cockroach infestation through sanitation procedures (e.g. the prompt removal of potential harborages and food sources such as garbage). However, even with the utmost vigilance this may not be completely effective. For example, even a completely sanitized apartment can become somewhat infested with cockroaches if there are surrounding apartments in the same building or a common sanitary system that are infested.

Insecticides and other insect control chemicals and/or biological agents have been used to try to control various insects. See generally U.S. Pat. Nos. 5,030,660 (deterrent substances), 5,066,482 (reproductive inhibitors), 5,302,387 (toxins), and 5,057,316 (fungal agents). The disclosure of these patents, and of all other publications referred to herein, are incorporated by reference as if fully set forth herein.

There have also been attempts to rely on chemical or biological attractants to lure insects to a trap or killing station. See generally U.S. Pat. Nos. 5,572,825 and 5,560,146. For example, pheromones have been used to attract cockroaches to a trap.

While chemical/biological approaches have considerable effectiveness in many cases, they do have some drawbacks. For example, some insecticides are not effective unless the insect directly contacts the insecticide. Further, the effectiveness of chemical or biological lures typically rapidly drops with distance from a baiting station or the like. Thus, multiple baiting stations may be required for adequate coverage of even relatively small residences or patio areas. Also, if the luring system requires an odorous volatile to be dispensed, consumers who find such odorants undesirable may not prefer that approach.

An alternative, very different, approach to insect control is to provide a large scale release of sterile insects. While this approach has been of some success on cargo ships and in certain agricultural and industrial settings, it is not desirable for application in residential settings. Homeowners are not typically willing to expose their families to a substantially increased infestation, notwithstanding the promise of future control of insects.

There have also been attempts to attract certain insects, particularly flying insects, using visible lights of certain wavelengths. However, these light-based attractants typically are also visible to consumers, which sometimes has undesirable aesthetic effects.

In a U.S. provisional patent application filed Nov. 14, 2005, U.S. Ser. No. 60/736,580, entitled USE OF ELECTROMAGNETIC FIELDS TO ATTRACT INSECTS, there was a discussion of using electromagnetic fields to attract certain insects. There was also discussion of using electromagnetism to facilitate trapping and/or killing of such insects.

See also U.S. Pat. No. 5,424,551 regarding exposing varied insects to particular selected frequencies, U.S. Pat. No. 6,757,574 regarding luring certain animals (particularly deer being hunted) into an area by simulating sounds such as environmental contact sounds, and U.S. Pat. No. 6,882,594 regarding generating turbulence waves to cause insects to avoid an area.

There have also been a number of publications regarding the communication ecology of moths. See generally U.S. Pat. No. 6,574,913 and H. Spangler et al., Ultrasonic Mate Calling In the Lesser Wax Moth, 9 Physiological Entomology 87-95 (1984); H. Spangler, Ultrasonic Communication In *Corcyra cephalonica* (Stainton) (*Lepidoptera: Pyralidae*), 23 J. Stored Prod. Res. 203-211 (1987); P. Trematerra et al., Ultrasound production In the Courtship Behaviour Of *Ephastia cautella* (Walk.), *E. kuehniella* Z. and *Plodia interpunctella* (Hb.) (*Lepidoptera: Pyralidae*), 31 J. Stored Prod. Res. 43-48 (1995); S. Takács et al., Where To Find A Mate? Resource-based Sexual Communication Of Webbing Clothes Moth, 89 Naturwissenschaften 57-59 (2002); S. Takács et al., Communication Ecology of Webbing Clothes Moth: Attractiveness And Characterization Of Male-Produced Sonic Aggregation Signals, 127 J. Appl. Ent. 127-133 (2003).

In C. Mistal et al., Evidence for Sonic Communication in the German Cockroach (*Dictyoptera: Blattellidae*), 132 Canadian Entomologist 867-876 (2000), there was a discussion of click sounds made by nymph and female German cockroaches. These were sound pulses by nymphs and females. The males did not generate this type of sound. Played-back these click sounds attracted nymphs (but not mature males and females). The Mistal article further mentioned that adult German cockroaches also fanned their wings when handled.

In D. Clark et al, Social Communication In The Madagascar Hissing Cockroach: Features Of Male Courtship Hisses And A Comparison Of Courtship And Agonistic Hisses, 132 Behavior 401-417 (1995) other sounds made by cockroaches were discussed (e.g. hisses).

Notwithstanding these developments it is still desired to develop other ways to affect cockroach behavior (particularly movement of female adult cockroaches), where these techniques do not require the use of chemicals.

BRIEF SUMMARY OF THE INVENTION

It was discovered that intermittent playback of cockroach wing-fanning sounds will attract cockroaches to a specified location. It is hypothesized that female cockroaches take this type of sound as an indication of a safe or otherwise desirable location (e.g. a location where procreation is possible).

It was also discovered that continuous or high incidence playing of cockroach wing-fanning sounds will tend to cause female cockroaches not to aggregate at a particular area, albeit those sounds may not be effective in dispersing female cockroaches from a site if they are already there. It is hypothesized that female cockroaches may take these sounds as an indication of an overcrowded site which is not worth approaching due to its overcrowded nature. However, if they are already at the site when the sound begins they will "know better."

It is expected that wing-fanning sounds played back at a rate greater than 54,000 wing beats per hour, will normally repel, while such wing-fanning sounds played back at a rate less than 1,800 wing beats per hour will normally tend to attract. The wing-fanning sounds can be trains of wing-fanning events (e.g., FIG. 2(A)). The recordings can be played for more or less than one hour. However, the decibel level of the playback should tend to shift these ranges somewhat.

In accordance with one form of the invention, one can generate a sound adjacent a location that simulates the sound of cockroach wing-fanning and exposes the cockroach to that simulated sound. The cockroach is thereby attracted towards the specified location (e.g. towards an acoustic generator). The cockroach may also remain near the specified location (as it is "arrested" by the acoustic generator). Preferably, this will involve playing a recording of less than 1,800 wing beats per hour. Most preferably the sound that is generated is a playing of a recording of naturally produced cockroach wing-fanning sounds and the cockroach is a female adult German cockroach (*Blattella germanica* (Linnaeus), *Dictyoptera: Blattellidae*).

It is proposed that the acoustic generator be positioned adjacent to or in an cockroach control device selected from the group consisting of cockroach traps, cockroach baiting stations containing a chemical toxic to cockroaches, and cockroach indicator stations. A variety of conventional cockroach traps are known. These can be retrofitted with an acoustic generator to practice the present invention. Consider for example applying such a generator to a central location of a trap of U.S. Pat. No. 5,572,825. Such a device could have the acoustic generator, with or without a chemical or biological attractant.

Alternatively, the device could be a baiting station provided with a conventional cockroach toxin. The toxin is not critical, and in any event can be an appropriate conventional toxin of the type optimized for the cockroach population of interest (e.g. boric acid powder).

Such a device may be designed to retain the cockroaches that have been attracted and killed. Alternatively, the device may be designed so that the cockroach feeds on or otherwise contacts a slow-acting poison, regardless of whether the poisoned cockroach remains in the device after being poisoned. For example, the toxin could be slow-acting and be of a type that causes the cockroach to contaminate its normal harborage after it leaves the device. This would facilitate control of the remainder of the population who do not visit the device.

Alternatively, the device may be for purposes of monitoring whether an infestation exists in a building or other area, rather than for by itself completely controlling the infestation. For example, a commercial pest control company might place such a device in a room. Then, after a day or so has passed, the device could be checked to see if any cockroaches are in it. If cockroaches are found, a further cockroach control treatment could be implemented (e.g. a general spraying). If no cockroaches were found, no further treatment would be provided in that area.

Apart from the attractant capability of the acoustic generator (as described herein), the device may be supplemented with additional attractants selected from the group consisting of chemical attractants, food attractants, and/or electromagnetic attractants for the cockroach. Chemical and food attractants should be selected so as to be optimal for the type of infestation population suspected, as is well known in the art.

In another aspect the invention provides a method for repelling a cockroach from a specified location. One generates a sound that simulates the sound of cockroach wing-fanning adjacent the location and exposes the cockroach to the sound. The cockroach is thereby repelled away from the specified location (typically away from the acoustic generator). Preferably, this will involve playing a recording of at least 54,000 wing beats per hour. Such a method may further include the step of using a synthetic chemical repellent, a pheromonal repellent, and/or a electromagnetic repellent.

Another aspect of the invention provides a cockroach control apparatus. There is a housing, an acoustic generator positioned adjacent to or in the housing, and at least one way for the cockroach to access the housing. The acoustic generator is capable of generating a sound that simulates the sound of cockroach wing-fanning.

Where there is also a device such as a trap, it may contain a toxic agent to kill entering cockroaches (and/or optionally other insects as well). The trap can alternatively have openings which enable insects to easily enter the trap yet have difficulty leaving (e.g. a tapered opening).

In another aspect the invention provides a cockroach control apparatus comprising a housing and an acoustic generator positioned adjacent to or in the housing. The acoustic generator is capable of generating a sound that simulates the sound of cockroach wing-fanning adjacent the location. Here the sound is of a nature that repels cockroaches.

An acoustic generator can be deployed on its own with attracting sounds to draw cockroaches towards a selected site (and thus away from another site). Thus, regardless of whether there is trapping or toxic capability, or even monitoring capability, having such a device at one position can keep cockroaches away from another (e.g. where a picnic is being held).

Reported below are successful experiments with both attracting and repelling cockroaches using varied recorded wing-fanning sounds that have been further processed to remove extraneous sounds, and in some cases to play the sounds back at faster than recorded speed. All of these variations are to be considered to be a "simulation" of the wing-fanning sound. As an alternative, the wing-fanning sounds could be "simulated" through computer or other means. Further, additional movement affecting sounds can be added.

It will be appreciated that the present invention provides improved methods for controlling cockroaches, and devices for practicing these methods. These devices are particularly well suited for use in residential environments. They permit luring or repelling of cockroaches at significant distances from the devices, and can be produced and operated at relatively low cost. Further, they help avoid adverse aesthetics (e.g. odors) which are present in a variety of prior art devices.

The foregoing and other advantages of the present invention will be apparent from the following description. In the description that follows reference is made to the accompanying drawings which form a part thereof, and in which there is shown by way of illustration, and not limitation, expected preferred embodiments of the invention. Such embodiments do not necessarily represent the full scope of the invention, and reference should therefore be made to the claims herein for interpreting the scope of the invention.

BRIEF DESCRIPTION OF THE DRAWINGS

FIG. 1 schematically illustrates how sounds of the present invention can be recorded;

FIG. 3 graphically illustrates other sound patterns useful in practicing the present invention;

DETAILED DESCRIPTION OF THE INVENTION

Figure 2:
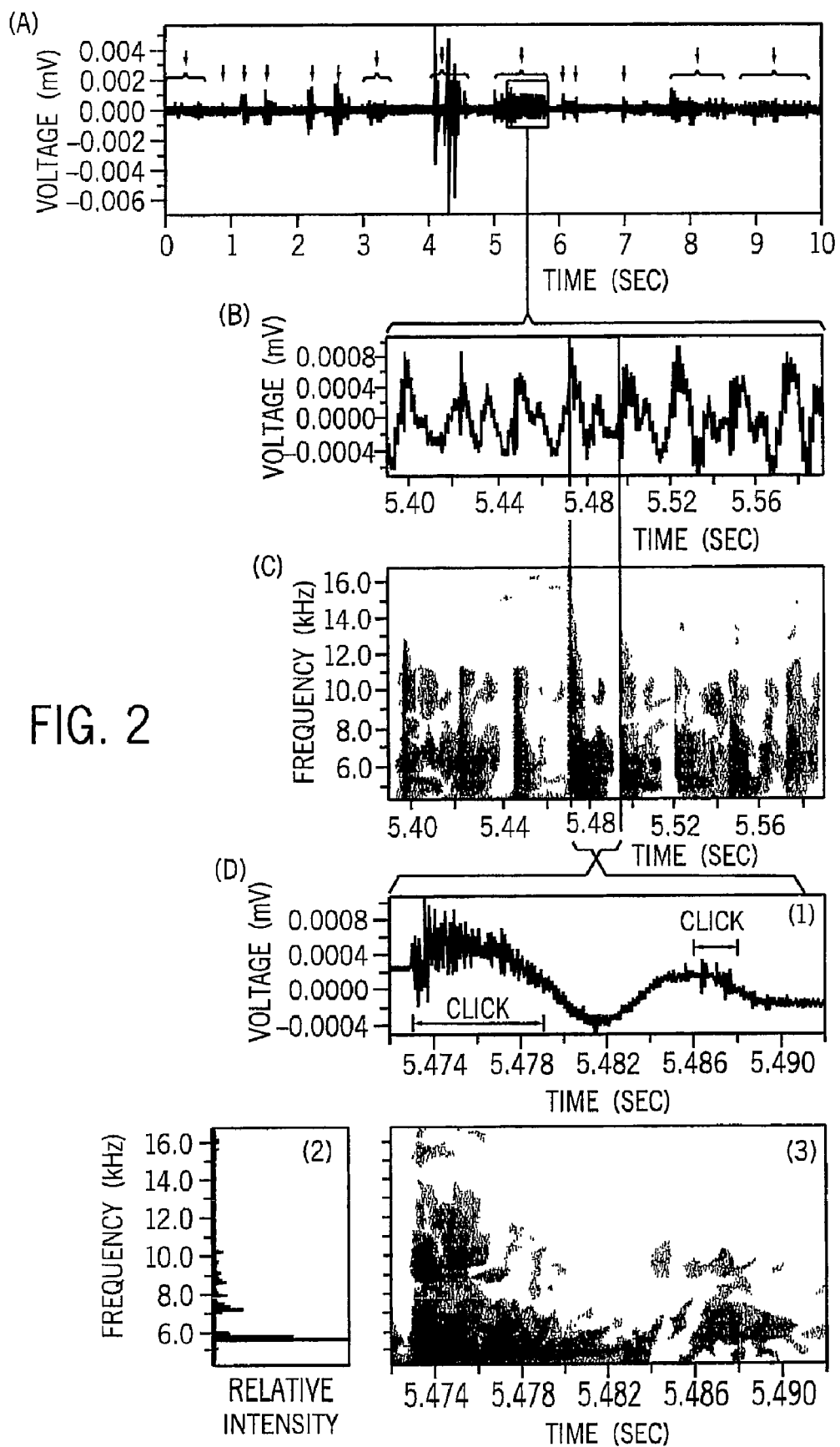
FIG. 2 graphically illustrates varied sound patterns useful in practicing the present invention.

Using a device like that depicted in FIG. 1 wing-fanning sound produced by male and female adult German cockroaches were recorded (nymphs do not have such wings as yet). An aquarium 10 with a lid (not shown) housed a ring stand with clamp 12 and plate base 16. Microphone 14 was hung from an arm of the clamp above Petri dish 18. Foam wedges 22 were positioned between microphone 14 and Petri dish 18. Petri dish 18 was supported by foam supports 20 sitting on base 16. Petri dish 18 housed cockroaches during the wing-fanning sound acquisition.

Commercially available software with recording, triggering, and monitoring capabilities obtained from National Instruments LabVIEW was used to record these sounds. A microphone cable 24 was connected to a pre-amplifier (not shown) and then to a digital acquisition card of a computer (also not shown). This software for audio recording is designed to: 1) stream audio data through a buffer at a user-defined sampling (scan) rate; 2) take user-defined numbers of pre-trigger and post-trigger scans to acquire and record the signal; 3) append subsequent audio data to the recording; and 4) continue data acquisition until a user-defined time limit is exceeded, or, the procedure is manually stopped. Recordings could be focused in the sonic range (0-24 kHz).

Characteristics of female-produced wing-fanning are shown in FIG. 2. FIG. 2(A) illustrates a voltage versus time graphing of wing-fanning events (marked by arrows). FIG. 2(B) depicts a voltage versus time graphing in more detail of one wing-fanning event involving eight wing beats. FIG. 2(C) shows the time versus relative intensity of a particular frequency of those eight wing beats. FIG. 2(D)(1) depicts the waveform of a single wing beat with two distinct clicks associated therewith. FIG. 2(D)(2) depicts the frequency versus intensity of such a single wing beat. FIG. 2(D)(3) depicts the time versus relative intensity of a particular frequency of such a single wing beat.

As shown in FIG. 2(A) these cockroaches produced single wing-fanning events as well as trains of wing-fanning events which lasted up to eleven seconds. Each wing-fanning event consisted of several wing beats as shown in FIG. 2(B). The mean number of wing beats per event was 8 ($\pm 4$), with the most intense wing beats in the mid-portion of the event. Associated with each wing beat was a low-frequency component of 23 Hz ($\pm 5$) (not shown). As shown in FIG. 2(D), two clicks were also associated with each wing beat.

The first wing beat was always more intense and the second wing beat was sometimes absent. As shown in FIG. 2(D), the first click consisted of a wide-band signal, with a mean dominant frequency of 6.6 kHz ($\pm 0.8$) and a mean signal range of 4 kHz ($\pm 1$) to 17 kHz ($\pm 6$) and the second click had a mean dominant frequency of 8.5 kHz ($\pm 0.5$). These characteristics were present in almost all of the recordings of aggregating females. However, these characteristics were less prevalent in recordings of isolated females.

Characteristics of a male-produced wing beat signal are shown in FIG. 3. FIG. 3(1) depicts an analysis of a waveform of the single wing beat signal. FIG. 3(2) depicts the frequency of the wing beat signal. FIG. 3(3) depicts the time-frequency sound intensity (sonogram) of the wing beat signal.

Compared to those produced by females, the male-produced wing beat events were generally shorter and consisted of fewer wing beats with the mean number of wing beats per event being 5 ($\pm 3$). Individual wing beats had a low frequency component of 23 Hz ($\pm 5$). As shown in FIG. 3, each wing beat resembled that produced by females, except males generated only one distinct click with a mean dominant frequency of 6.8 kHz ($\pm 0.8$), with a frequency range of 4 kHz ($\pm 1$) to 17 kHz ($\pm 6$). No such signals were found in attempted recordings of nymphs.

Figure 4:
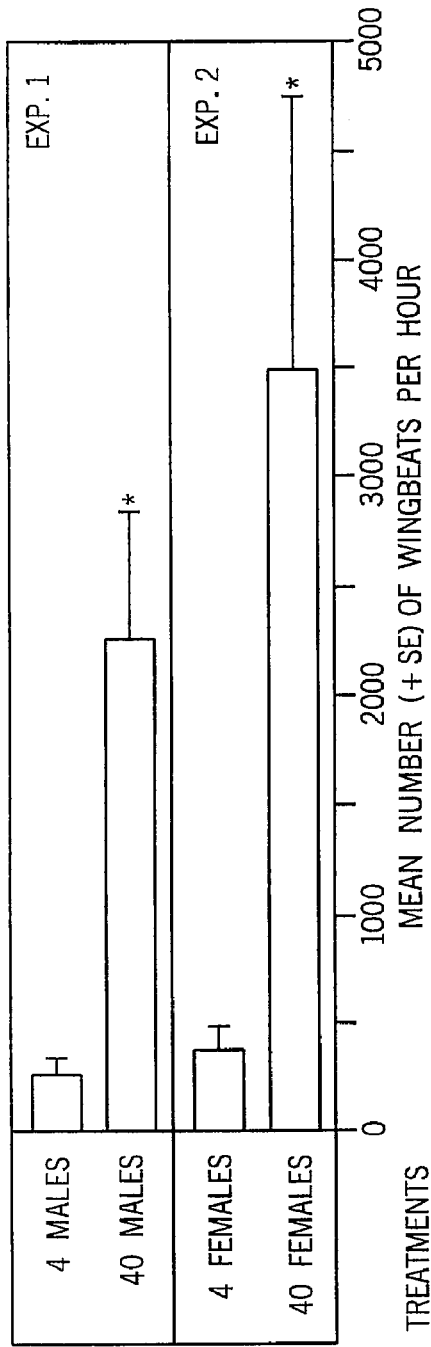
FIG. 4 graphically illustrates information regarding wing beats per hour for varied numbers of males and females in a confined region.

The incidence of wing beats of both male and female cockroaches was recorded during Experiments 1 and 2 (the results being in FIG. 4). Recordings of separate groups of four or forty males or females were made for ten-minute periods. The insects were provided with food and water prior to the recordings (thereby creating a calm predisposition) but were not provided food or water during the recordings.

The wing-fanning sound seemed to be produced spontaneously by aggregating individuals, and the incidence appeared dependent upon aggregation density. Aggregations of forty insects produced ten times more signals than aggregations of four insects in the same area, suggesting that incidence is directly proportional to the number of aggregating insects, rather than a result of interactions between individuals.

As shown in FIG. 4, forty-insect aggregations produced more wing-fanning signals than four-insect aggregations in both males (Exp. 1, $P \leq 0.002$) and females (Exp. 2, $P \leq 0.001$). However, wing-fanning signal incidence per insect was not statistically different in both low- and high-density aggregations. Thus, the degree of crowding does not appear to affect the number of wing beats per minute produced by an individual cockroach. This makes the other results even more surprising.

Figure 5:
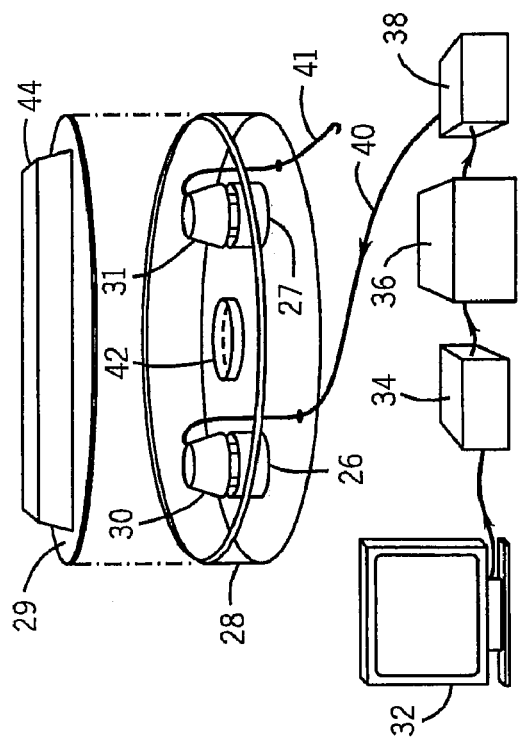
FIG. 5 schematically illustrates a test area of a type similar to that where experiments 3-8 were conducted.

It was next investigated whether wing-fanning signals at high incidence deterred cockroaches from joining an aggregation. As depicted in FIG. 5, the bioassay setup for experiments 3-8 comprised a treatment shelter 26 and a control shelter 27 in a Plexiglas® arena 28 with lid 29. Treatment shelter 26 consisted of an inverted plastic cup housing for a treatment speaker 30 and a metal can baited with peanut butter, dog chow, fecal pellets and water. Control shelter 27 consisted of an inverted plastic cup housing for a control speaker 31 and a metal can baited with peanut butter, dog chow, fecal pellets and water in amounts identical to that of treatment shelter 26. Shelters 26 and 27 were placed at opposing positions in the arena 28 and were equidistant from the center and edges. Positions of treatment shelter 26 and control shelter 27 were alternated between replicates and rotated 90 degrees after two replicates.

The treatment speaker 30 played back recordings of wing-fanning signals that were edited to manipulate the number of signals per time, reduced extraneous noise, and enhance the signal-to-noise ratio using a custom filtering program. Treatment speaker 30 was powered by a PCI-MIO-16XE10 or PCI 6281 data acquisition card connected to a computer 32. To provide the play-back wing-fanning signals, a computer 32 was connected to a connector block 34 that was connected to a connector housing 36 that was connected to an amplifier 38 that was connected to a treatment speaker wire 40 that was connected to treatment speaker 30. A control speaker wire 41 was connected only to control speaker 31. Sound levels were adjusted to simulate those typically emitted by German cockroaches (55 decibels at 1 cm from the source). Both female and male wing-fanning signals consisted of ten second recordings of wing-fanning stored in computer 32. The signal was repeated over the duration of the experiment. The control speaker 31 was silent.

For each replicate a Petri dish 42 confining forty male, female, or nymph German cockroaches (all starved for two days) was placed at the center of the arena 28. A light 44 (controlled by a timer not shown) on the arena lid 29 provided the light for photophase (i.e., light phase). One hour later, at the beginning of scotophase (i.e., dark phase), the insects were released, and twenty hours later their position was recorded. Responders were defined as insects inside or within 2.5 cm of a shelter.

Experiments 3-5 tested the response of females (Exp. 3), males (Exp. 4), and nymphs (Exp. 5) to female-produced wing-fanning sound at 360 10-second trains of wing-fanning events [see FIG. 2(A)](=54,000 wing beats) per hour at 55 decibels (at 1 cm from the source). Experiments 6-8 tested the response of females (Exp. 6), males (Exp. 7), and nymphs (Exp. 8) to male-produced wing-fanning sound at 360 10-second trains of wing-fanning events [see FIG. 2(A)] (=54,000 wing beats) per hour at 55 decibels (at 1 cm from the source).

Figure 6:
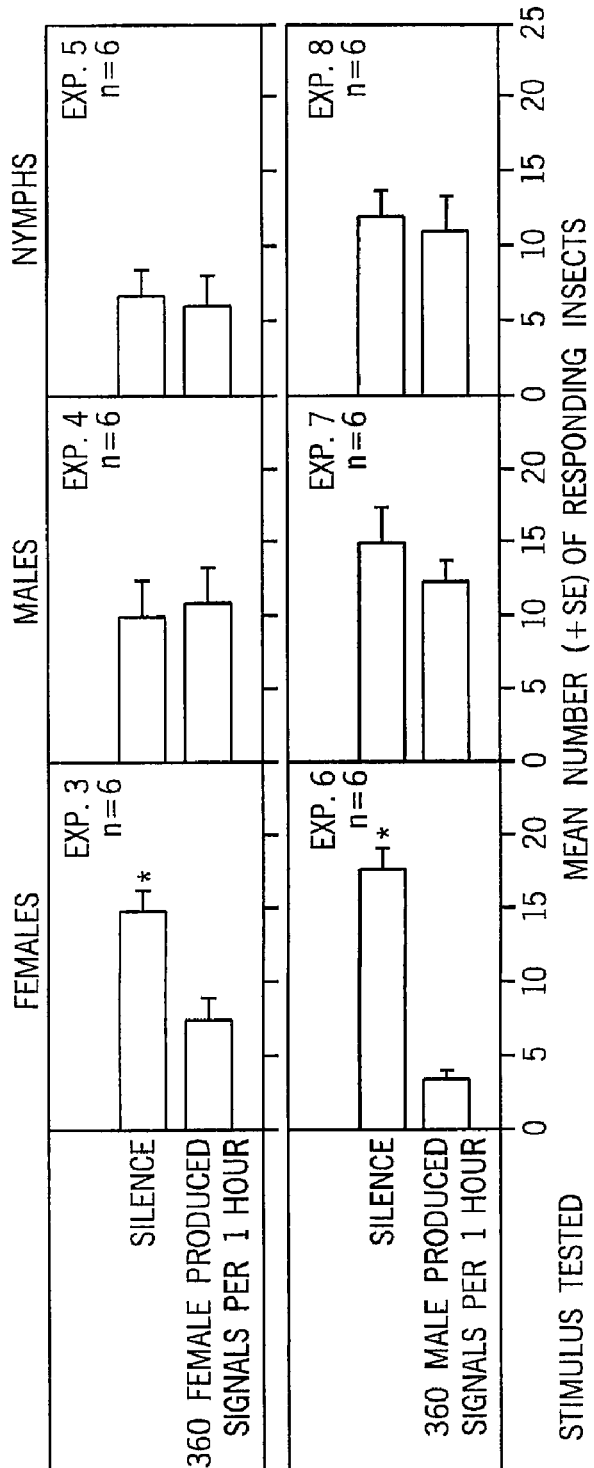
FIG. 6 graphically illustrates the results of experiments 3-8.

As shown in FIG. 6, significantly fewer adult females entered shelters associated with female-produced (FIG. 6, Exp. 3) or male-produced (FIG. 6, Exp. 6) wing-fanning signals. The same two signals, however, failed to deter males (FIG. 6, Exps. 4, 7) or nymphs (FIG. 6, Exps. 5, 8). Hence, the recordings were effective in repelling adult female roaches.

Figure 7:
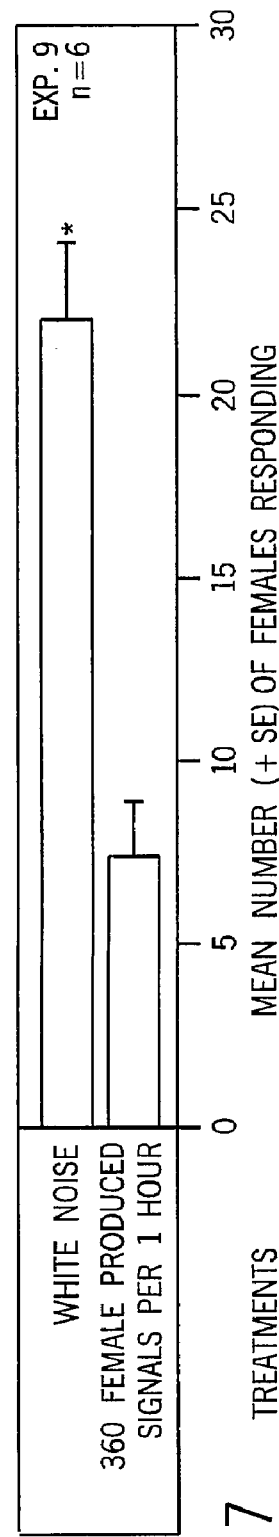
FIG. 7 graphically illustrates the results of experiment 9.

It was then tested to confirm that it was the nature of the sound, not noise per se, which led to the repelling. Hence, in experiment 9 the response of females to female-produced wing-fanning signals was compared versus white noise of a similar decibel level. White noise is sound having a frequency spectrum that is continuous and uniform over a specified frequency band. The white noise was played back at the same intensity and duration as the wing-fanning signals. As shown in FIG. 7, experiment 9 confirmed that shelters associated with the high incidence wing-fanning sound recording harbored fewer roaches after the experiment than shelters associated with white noise. Hence, it was the nature of the sound that was affecting repelling to some extent.

Figure 8:
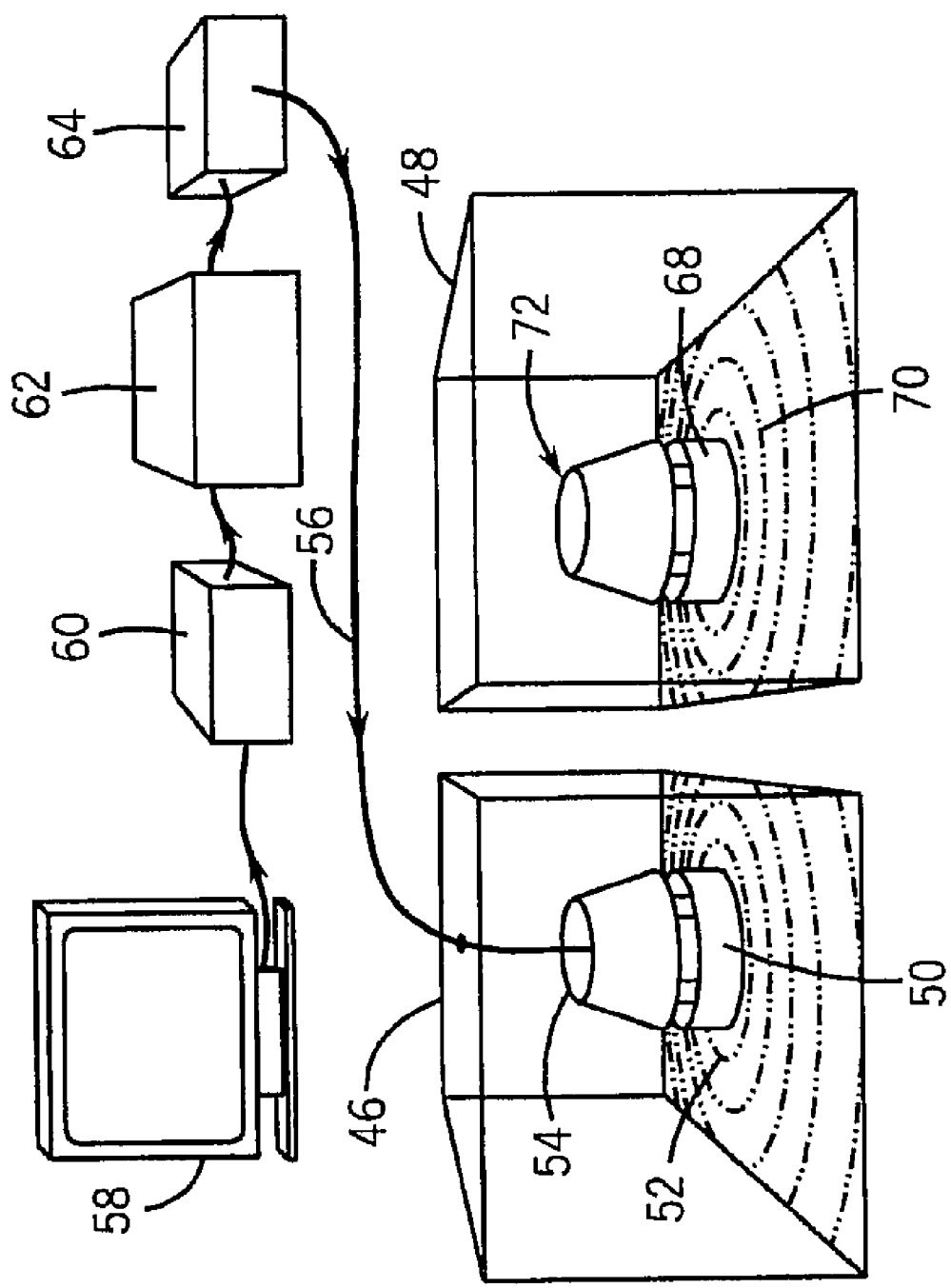
FIG. 8 schematically illustrates a test area of a type similar to that where experiments 10-15 were conducted.

It was next investigated whether wing-fanning at high-incidence induces dispersal in aggregating individuals. As depicted in FIG. 8, the setup of experiments 10-15 comprised a treatment aquarium 46 and an identically-sized control aquarium 48.

The treatment aquarium 46 housed a treatment shelter 50 placed in the center of a set of concentric rings 52. A treatment speaker 54 was placed on top of treatment shelter 50. To provide the play-back wing-fanning signals, a computer 58 was connected to a connector block 60 that was connected to a connector housing 62 that was connected to an amplifier 64 that was connected to a treatment speaker wire 56 that was connected to treatment speaker 54.

The control aquarium 48 housed a control shelter 68 placed in the center of a set of concentric rings 70 identical to concentric rings 52. A control speaker 72 was placed on top of control shelter 68. A control speaker wire was connected only to control speaker 72.

For reach replicate, forty male, female, or nymph German cockroaches were confined in shelters 50 and 68 that were placed in each aquarium eight hours into the photophase. After one hour, the lids of the shelters 50 and 68 were carefully removed and the insects were exposed to played-back wing-fanning signals at 55 decibels (treatment) or silence (control). Insects were observed and their positions were recorded every five minutes for sixty minutes.

Interestingly, once the roaches had reached a harborage before the sound started, an otherwise repelling sound did not act to disperse the roaches. This may be indicative of these roaches having other communication or learning facilities which override the otherwise repelling nature of the sound once the roaches are already aggregated.

It was next investigated whether shelters associated with intermittent play-back of female-produced wing-fanning signals (conveying low to moderate aggregation density) attracted more foraging female German cockroaches than did shelters associated with silence, and whether shelters associated with continuous play-back of female-produced wing-fanning signals (conveying high aggregation density) repelled foraging female German cockroaches. The experimental design for each of experiments 16-19 was similar to that described for experiments 3-8 (as shown in FIG. 5), except that only females were bioassayed, only female-produced wing-fanning signals were played back as test stimulus, and portable CD players were used for sound play-back. The control stimulus in each of experiments 16, 17, 18 and 19 was a shelter associated with silence, whereas the corresponding treatment stimulus was a shelter associated with, respectively, 3, 12, 60, and 360 10-second trains of wing-fanning events per hour.

Figure 9:
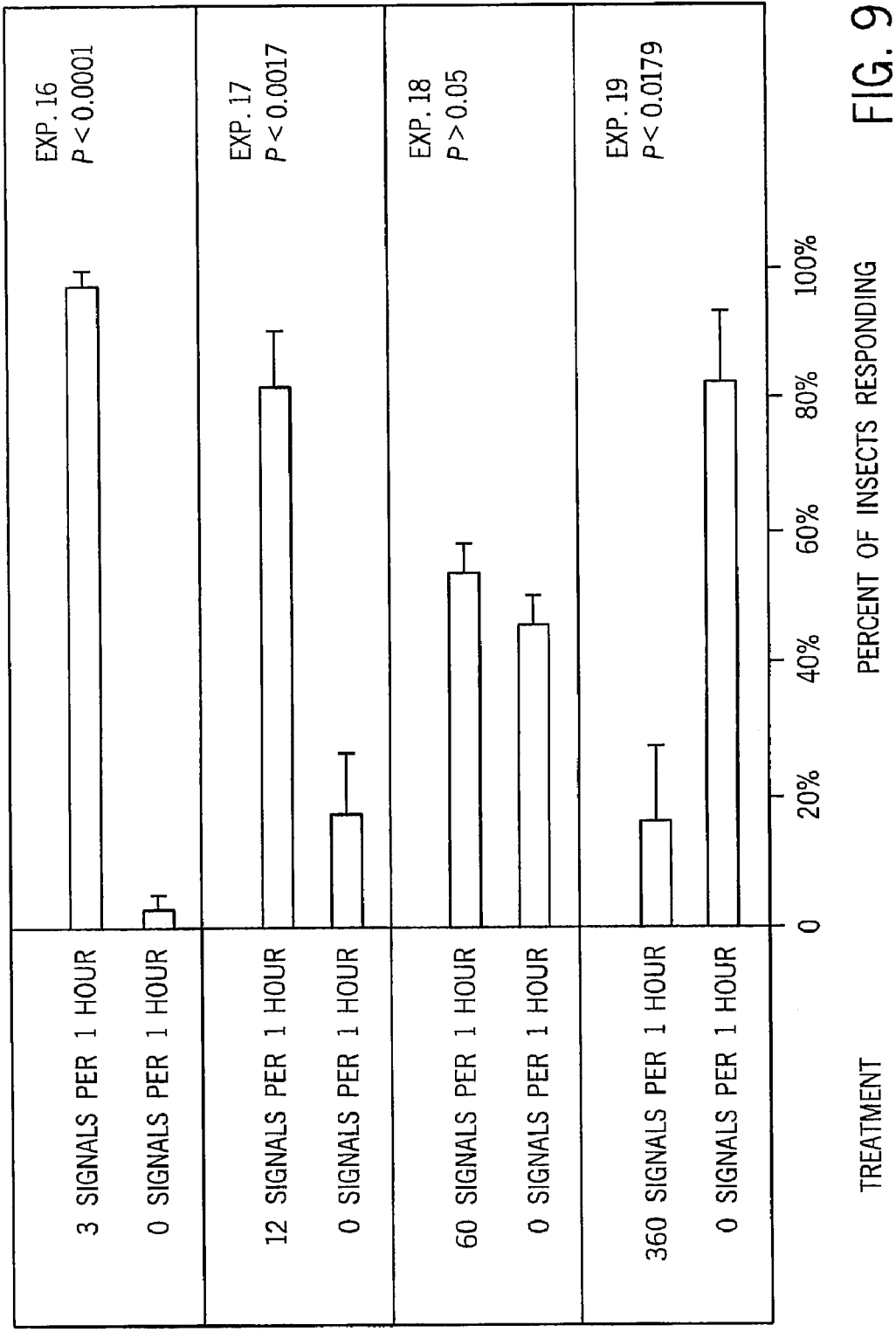
FIG. 9 graphically illustrates the results of experiments 16-19.

As shown in FIG. 9, the intermittent play-back actually attracted roaches. Further, as the incidence of the wing beats increased, the effect was reduced. It is expected that a cockroach can be repelled by playing a recording of wing-fanning sounds at a rate equaling or exceeding 360 10-second trains of wing-fanning events per hour and, essentially equivalently, at a rate of greater 9,000 wing-fanning events per hour, the wing-fanning events having an average of 12 wing-beats per wing-fanning event. Additionally, it is expected that a cockroach can be attracted by playing a recording of wing-fanning sounds at a rate equaling or less than 12 10-second trains of wing-fanning events per hour and, essentially equivalently, at a rate equaling or less than 120 wing-fanning events per hour, the wing-fanning events having an average of 4 wing-beats per wing-fanning event.

Figure 10:
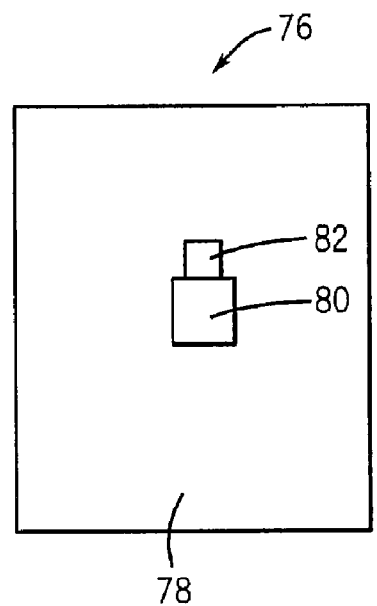
FIG. 10 is a schematic top view illustration of one possible cockroach trap of the present invention, of the glue trap type.

FIG. 10 schematically depicts a cockroach control trap 76 of the present invention having a wall 78 coated with an adhesive of the type conventionally used for glue traps. An acoustic generator 80 is centered on the trap, and is designed to emit an attracting wing-fanning sound such as the intermittent play-back sound used in experiment 16 (3 10-second trains of wing-fanning events per hour or an equivalent 450 wing beats per hour). A panel 82 may be positioned next to the acoustic generator 80. There will typically be a power source for the acoustic generator 80. It may be a plug-in electrical cord. Alternatively, the power source may be a battery or other electrical power source which provides greater flexibility in the placement of the trap 76. For example, in the case of a trap 76 to be used outdoors, a solar cell might be used to power the generator 80.

The panel 82 is preferably coated with a pheromone of the type known to attract cockroaches. An attracting wing-fanning sound and the pheromone cooperate to attract cockroaches. When a cockroach crawls or lands on the wall 78, they are trapped on the device, and thereby ultimately killed.

Figure 11:
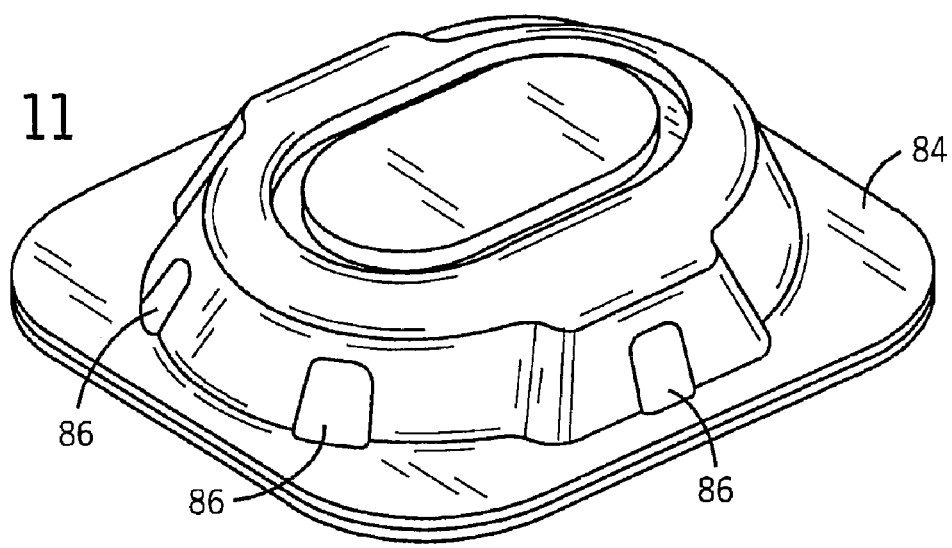
FIG. 11 is a top, frontal perspective view of another cockroach trap of the present invention, of the toxic bait type.
Figure 12:
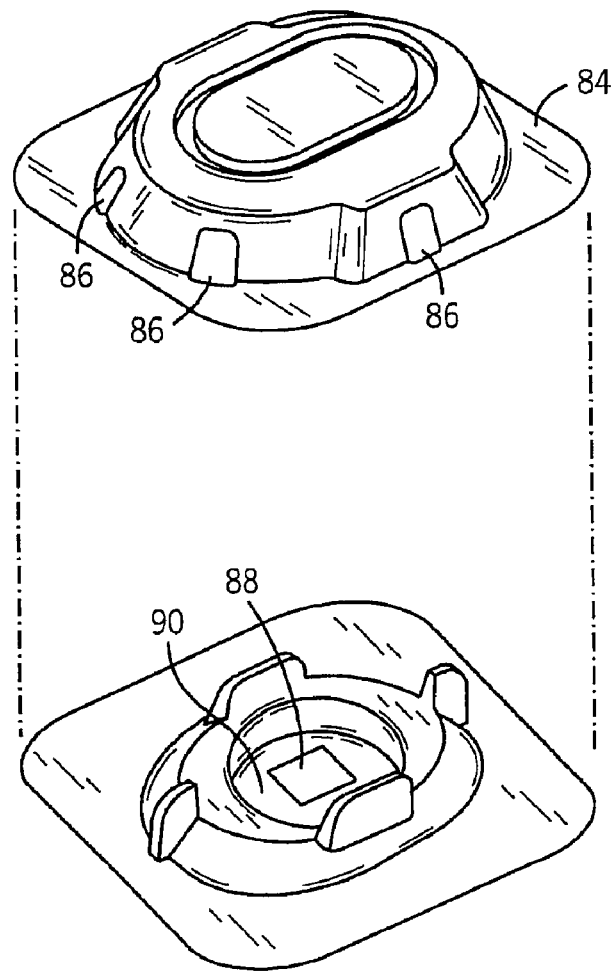
FIG. 12 is an exploded perspective view of the FIG. 11 device.

FIGS. 11 and 12 disclose a cockroach trap which uses a toxic bait, rather than an adhesive, to control the insect. Here there is a housing 84 with entryways 86 sized to allow an insect such as a cockroach to enter. An acoustic generator 88 that emits an attracting wing-fanning sound as discussed above is positioned inside the housing 84. There is a baiting material 90 such as food material that is mixed with an insect toxin. Cockroaches are attracted by attracting wing-fanning sound produced by the generator 88, as well as the food attractant, into the housing 84. They then ingest or otherwise come into contact with the toxin, and are thereby controlled.

A wide variety of toxic baits may be suitable for use in connection with the present invention. By way of example, and not limitation, these may include boric acid, propoxor, sulfuramid; chlorpyrifos, and hydramethylnon infused bait.

Similarly, a wide variety of insect toxins are useful in connection with the present invention. By way of example and not limitation, some toxins suitable for use inside residential buildings include boric acid dust and permethrin dust. Examples of toxins suited for use outside buildings include (without limitation) organophosphates, carbamates, synthetic pyrethroids, and botanicals.

Figure 13:
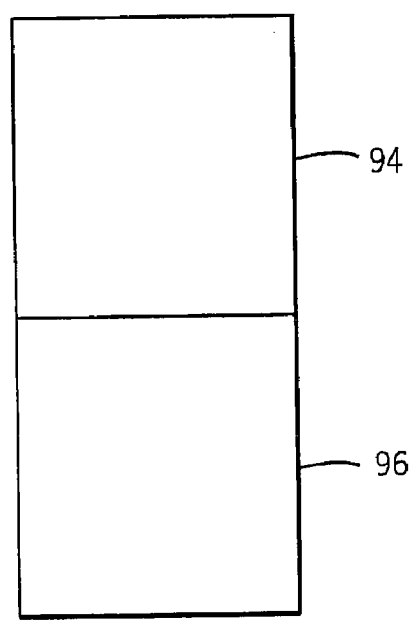
FIG. 13 is a top view of one possible cockroach repelling apparatus of the present invention.

FIG. 13 schematically depicts another cockroach control apparatus 92 of the present invention having an acoustic generator 94 that emits a repelling wing-fanning sound such as the high incidence sound employed in experiments 3-9 and 19 (360 10-second trains of wing-fanning events per hour or an equivalent 54,000 wing beats per hour).

While a number of embodiments of the present invention have therefore been described, it should be appreciated that there are numerous other embodiments of the invention within the spirit and scope of this disclosure. For example, it is expected that similar results to those found in the experiments on German cockroaches will be found in experiments with other types of cockroaches. Hence, the invention is not to be limited to just the specific embodiments shown or described.

INDUSTRIAL APPLICABILITY

Provided herein are insect traps and other insect control devices particularly well suited for use in residential locations to control cockroaches.

The invention claimed is:

1. A method for affecting movement of a cockroach with respect to a specified location, comprising:
   generating a sound adjacent the specified location that simulates the sound of cockroach wing-fanning; and
   exposing the cockroach to that simulated sound;
   whereby the cockroach is one of attracted towards the specified location and repelled away from the specified location;
   wherein the cockroach is attracted towards an acoustic generator which generates the sound; and
   wherein the sound that is generated is a playing of a recording of naturally produced cockroach wing-fanning sounds with the naturally produced wing-fanning sounds at a rate equaling or less than 1,800 wing beats per hour.

2. The method of claim 1, wherein the cockroach is a female adult German cockroach.

3. The method of claim 1, wherein the recording of naturally produced cockroach wing-fanning sounds comprises a plurality of trains of wing-fanning events.

4. The method of claim 1, wherein the cockroach is caused by the method to also remain near the specified location in arrested fashion.

5. The method of claim 1, wherein the sound is generated by an acoustic generator positioned adjacent to or in a cockroach control device selected from the group consisting of cockroach traps, cockroach baiting stations having a chemical toxic to cockroaches, cockroach feeding stations having a chemical toxic to cockroaches, and cockroach indicator stations.

6. The method of claim 5, wherein the cockroach control device further comprises an additional attractant apart from the sound generation selected from the group consisting of chemical attractants, food attractants, and electromagnetic attractants for the cockroach.

7. The method of claim 1, wherein the cockroach is repelled away from an acoustic generator which generates the sound.

8. A method for affecting movement of a cockroach with respect to a specified location, comprising:
   generating a sound adjacent the specified location that simulates the sound of cockroach wing-fanning; and
   exposing the cockroach to that simulated sound;
   whereby the cockroach is one of attracted towards the specified location and repelled away from the specified location;
   wherein the cockroach is repelled away from an acoustic generator which generates the sound; and
   wherein the sound that is generated is a playing of a recording of naturally produced cockroach wing-fanning sounds with the naturally produced cockroach wing-fanning sounds at a rate equaling or greater than 54,000 wing beats per hour.

9. The method of claim 8, wherein the recording of naturally produced wing-fanning sounds comprises a plurality of trains of wing-fanning events.

10. The method of claim 7, wherein while the cockroach is exposed to the sound it is also being exposed to an additional repellent selected from the group consisting of chemical repellents, biological repellents and electromagnetic repellents.

11. A cockroach control apparatus, comprising:
   a housing;
   an acoustic generator positioned adjacent to or in the housing; and
   at least one way for the cockroach to access the housing;
   wherein the acoustic generator is capable of generating a sound that simulates the sound of cockroach wing-fanning;
   wherein the sound is capable of attracting a cockroach; and
   wherein the sound that can be generated is naturally produced cockroach wing-fanning sounds with the naturally produced wing-fanning sounds at a rate equaling or less than 1,800 wing beats per hour.

12. The cockroach control apparatus of claim 11, wherein the cockroach control apparatus further comprises a toxic agent suitable to kill entering cockroaches.

13. The cockroach control apparatus of claim 11, further comprising an additional attractant selected from the group consisting of chemical attractants, food attractants, and electromagnetic attractants for the cockroach.

14. A cockroach control apparatus, comprising:
   a housing;
   an acoustic generator positioned adjacent to or in the housing; and
   at least one way for the cockroach to access the housing;
   wherein the acoustic generator is capable of generating a sound that simulates the sound of cockroach wing-fanning;
   wherein the sound is capable of repelling a cockroach; and
   wherein the sound that can be generated is naturally produced cockroach wing-fanning sounds with the naturally produced cockroach wing-fanning sounds at a rate equaling or exceeding 54,000 wing beats per hour.

15. The cockroach control apparatus of claim 14, further comprising an additional repellent selected from the group consisting of chemical repellents, biological repellents and electromagnetic repellents.

* * * * *